Oct. 27, 1931.  W. B. ROSS  1,829,371

VALVE HANDLE

Filed March 7, 1931

WITNESS
H. L. Meade.

INVENTOR
W. B. Ross
BY
Denison & Thompson
ATTORNEYS

Patented Oct. 27, 1931

1,829,371

UNITED STATES PATENT OFFICE

WALLACE B. ROSS, OF SYRACUSE, NEW YORK, ASSIGNOR TO DIEMOLDING CORPORATION, OF CANASTOTA, NEW YORK, A CORPORATION OF NEW YORK

VALVE HANDLE

Application filed March 7, 1931. Serial No. 520,849.

This invention relates to a valve handle adapted to be used more particularly in the operation of rotary valve stems, but obviously may be used for other purposes, if desired.

These handles are made in large quantities from bakelite or other material moldable under pressure between suitable dies and are usually provided with sockets corresponding to the size of the end of the valve stem to which it is to be applied.

Under the usual practise, these sockets have been incorporated in the handles according to the size or shape of the stem to which the handle is applied, thus necessitating the use of separate molds for the handles having different sized sockets even though the size and contour of the handles may be substantially the same.

Furthermore, in many instances it is desirable to remove the handle from the stem after the valve has been closed or otherwise set to the desired position to prevent careless or malicious operation of the valve from such position.

One of the objects, therefore, of the present invention is to provide a molded handle with a movable element having a series of sockets, any one of which may be brought into co-axial alignment with the handle by proper adjustment of said element to enable the same handle to be used with valve stems of correspondingly different sizes.

Another object is to provide means for holding the socketed element against relative angular or axial displacement when adjusted upon the handle for use.

Other objects and uses relating to specific parts of the device will be brought out in the following description.

In the drawings:—

Figure 1:
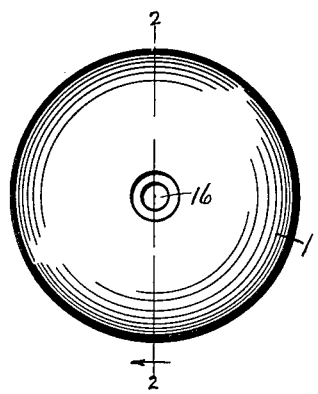
Figure 1 is an outer face view of a handle equipped with my invention.

As illustrated, this handle comprises a main body 1 of bakelite or equivalent material molded into circular form with its outer end concavo-convex in cross section and provided with a hub 2 and an annular flange 3 surrounding the hub in spaced relation thereto throughout the major portion of its length to form intervening cavities 4, the inner end faces of the hub 2 and rim 3 being disposed in substantially the same flat plane except as hereinafter specified.

The inner end of the handle body 1 is formed with a substantially circular recess 5 eccentric to the axis of the main body and having a diameter somewhat greater than the radius of the molded portion of the main body of the handle, said recess being formed wholly within the marginal edges of the handle body so that a portion thereof may extend some distance beyond the axis of the handle.

A flat circular metal plate 6 of substantially the same diameter as the recess 5 is removably inserted in said recess and is provided with a plurality of, in this instance four, sockets or openings 7, 8, 9 and 10, all of which are, in this instance, square, but of different sizes for receiving valve stems of corresponding shapes and sizes, the centers of the sockets being equal distances from the center of the circular recess 5 and disk 6 so that by proper adjustment of the disk relatively to the recess, any one of the sockets may be brought into co-axial relation to the axis of the handle body 1.

Figure 2:
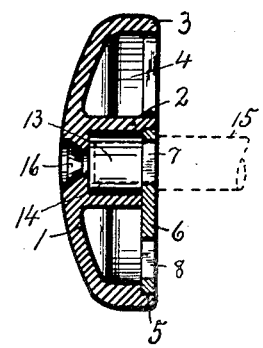
Figure 2 is a longitudinal sectional view of the same handle taken in the plane of line 2—2, Figure 1.

The axial depth of the recess 5 and plate 6 is substantially the same so that when the plate 6 is seated against the bottom of the recess its inner face will be substantially flush with that of the inner end of the handle body 1, as shown more clearly in Figure 2.

Figure 3:
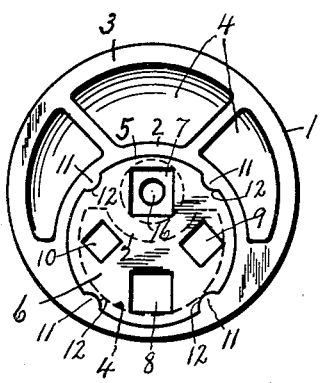
Figure 3 is an inner end face view of the handle shown in Figures 1 and 2 with the socketed plate therein.
Figure 4:
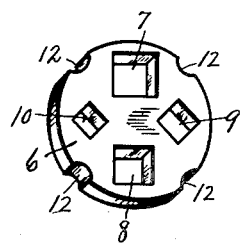
Figure 4 is a perspective view of the detached plate showing the relative positions of the several sockets.

Suitable means is provided for holding the disk 6 in any one of its adjusted positions relatively to the recess 5 and for this purpose the inner peripheral wall of the recess is provided with a series of, in this instance four, lugs or keys 11 arranged in uniformly spaced relation circumferentially and preferably in radial lines midway between the sockets in the plate 6 for engaging the corresponding keyways 12 in the periphery of the disk 6, as shown more clearly in Figures 3 and 4.

The disk 6 may be removed by hand from its recess 5 and turned about its axis to register any one of the sockets 7, 8, 9 or 10 with the axis of the handle body 1, at which time the recesses 12 in the periphery of the disk will have been brought into registration with the lugs 11 on the peripheral wall of the recess 5, whereupon the disk may then be inserted endwise into the recess with the assurance that it will be held against relative rotating therein by means of the keys 11 entering the recesses 12.

The hub 2 is provided with a socket 13 opening from the inner end thereof co-axial with the axis of the main body 1, and of sufficient size to permit the entrance of the angular end 14 of the valve stem 15, shown by dotted lines in Figure 2.

The outer end of the handle body 1 is provided with a reduced tapered socket 16 co-axial with the socket 14 for receiving a conventional screw which is adapted to enter a threaded socket in the adjacent end of the valve stem 15, in the usual manner, the portion of the valve stem adjacent the inner face of the plate 6 being provided with an annular shoulder 15' for engaging said plate and holding the latter against inward displacement when the handle is secured to the valve stem.

Operation

Assuming that he disk or plate 6 has been adjusted to register the opening 7 with the axis of the handle body 1 for engaging the outer end of the valve stem 15 and that it is desired to use the same handle on a valve stem having its outer end of the same size as the socket 8, then it is simply necessary to remove the disk 6 from the recess 5 and adjust it rotarily until the socket 8 is registered with the axis of the handle body 1, whereupon the disk will be re-inserted in the recess 5 and locked against rotary movement by the lugs 11.

The handle with the socket 8 co-axial with the axis of the body 1 is then placed upon the corresponding outer end of the other valve stem.

In like manner the other sockets 9 and 10 may be brought into registration with the axis of the main body 1 for receiving other valve stems of corresponding sizes.

The construction and arrangement of the disk 6 within the recess 5 in the inner end of the handle body 1, and the means for locking the disk against rotation when adjusted for use are particularly simple, practical and efficient and permits the same handle to be used with different size valve stems according to the number of sockets of different sizes which may be formed in the disk 6.

What I claim is:—

1. A handle for rotary valve stems and the like comprising a main body, and a plate operatively mounted thereon and provided with sockets of different sizes for receiving stems of corresponding sizes, said plate being movable to different positions to register any one of the sockets with the axis of the main body.

2. A handle for valve stems as in claim 1 in which the main body and plate are provided with co-operative means for holding those parts against relative rotation when assembled for use upon a valve stem.

3. A handle for rotary valve stems and the like comprising a main body having a recess in its inner end eccentric to the axis of the handle, and a plate having a plurality of sockets of different sizes for receiving valve stems of corresponding sizes, said plate being movable into and out of the recess and adjustable, when removed, for registering any one of the sockets with the axis of the handle.

4. A handle for rotary valve stems and the like comprising a main body having a substantially circular recess in one end eccentric to its axis, and a plate co-axial with said recess and provided with a plurality of sockets of different sizes for receiving stems of corresponding sizes, said plate being movable into and out of the recess and adjustable rotarily when removed to register any one of the sockets with the axis of the handle.

5. A handle for rotary valve stems and the like comprising a main body having a co-axial socket in its inner end, and a plate removably mounted on said end to extend across the socket and provided with a plurality of sockets of different sizes arranged uniform distances from and around a common center which is offset from the axis of the handle, said plate being movably angularly to register any one of the sockets with the socket in the main body.

6. A handle for rotary valve stems and the like as in claim 5 in which means is provided for holding the plate and body against relative rotary movement.

In witness whereof I have hereunto set my hand this 4th day of March, 1931.

WALLACE B. ROSS.